United States Patent
Bates et al.

[11] 3,709,999
[45] Jan. 9, 1973

[54] VACUUM INDUCTION HEAT TREATMENT OF LONG TUBULAR PRODUCTS

[75] Inventors: Kenneth T. Bates, Dundas, Ontario; Michael R. Hoare, Burlington, Ontario, both of Canada

[73] Assignee: Westinghouse Canada Limited, Hamilton, Ontario, Canada

[22] Filed: July 30, 1970

[21] Appl. No.: 59,623

[30] Foreign Application Priority Data

Sept. 29, 1969 Canada..............................063,460

[52] U.S. Cl....................13/26, 13/31, 13/DIG. 1, 219/10.57
[51] Int. Cl..............................................H05b 5/00
[58] Field of Search......219/8.5, 10.57, 10.67, 10.79; 13/31, DIG. 1, 26

[56] References Cited

UNITED STATES PATENTS

| | | | |
|---|---|---|---|
| 3,023,091 | 2/1962 | Smith | 23/301 |
| 2,930,098 | 3/1960 | Emeis | 25/157 |
| 2,905,798 | 9/1959 | Freutch | 219/10.43 |
| 2,897,329 | 7/1959 | Matare | 219/10.43 |
| 2,688,169 | 9/1954 | Gruber et al. | 22/200 |

Primary Examiner—J. V. Truhe
Assistant Examiner—Hugh D. Jaeger
Attorney—R. H. Fox

[57] ABSTRACT

This invention relates to a long tubular furnace which is composed of two or more sections which are separable in the central section of the furnace. The contained article undergoing treatment is moved at a controlled rate through the central section of the furnace where an induction heater provides the required heating energy.

3 Claims, 2 Drawing Figures

PATENTED JAN 9 1973  3,709,999

INVENTOR.

BY

VACUUM INDUCTION HEAT TREATMENT OF LONG TUBULAR PRODUCTS

BACKGROUND OF THE INVENTION

This invention relates to a vacuum induction heat treatment facility for long tubular products. In particular it relates to the vacuum annealing of long tubular members which are composed of a reactive material. In the production of nuclear reactors, it is often necessary to anneal long tubular products such as zirconium alloy tubes after a series of operations which tends to work harden the material. In the past, such annealing has been carried out in a vacuum furnace, in which the complete tube is subjected to the required thermal conditions. Heating of the tube is effected generally by the direct radiation from the heating elements or the furnace walls. In this type of furnace, it is necessary that the furnace chamber be of sufficient size to accommodate many tubes and be capable of subjecting all parts of all tubes to the same thermal conditions consistent with the allowable tolerances for the thermal treatment desired. Of course, the use of a large vacuum furnace for heat treating long tubular products has certain inherent disadvantages. The first, of course, is the high capital cost which is incurred for the procurement and operation of the vacuum furnace. Secondly, due to the masses involved, the heating and cooling times which are necessary, cause severe inconvenience and unavoidable delays in production facilities. The heating and cooling times associated with heat treatment of materials in a large furnace are merely worsened by the fact that for the material of this invention, it is necessary to have a vacuum or inert atmosphere. The third difficulty in the operation of a vacuum furnace is the problem of assuring that the long tubular objects receive the proper thermal treatment throughout the length of the tube. A fourth difficulty in the operation of a heat treatment vacuum furnace is the problem of measuring and recording the heat treatment operation on all parts of the tube in order to assure that all the parts have received the same heat treatment.

SUMMARY OF THE INVENTION

This invention provides a solution to all of the above problems, by applying an induction heating facility to a long tubular heat treatment chamber.

The chamber is composed of three portions: two similar capped end portions (hereinafter referred to as end tubes) which are joined in the center by a third portion, a non-conducting tube preferably composed of pyrex or quartz; the end tubes may be composed of any suitable material which has been treated to remove occluded gases, and are generally of a cylindrical nature, having closed end caps. The end tubes are sealed to the central portion by means well known in the art. One of the end tubes is made to be easily removable from the central quartz or glass tube. The operation is as follows.

An end tube is removed from the vacuum heat treatment assembly. A tube which is to be heat treated is placed in the balance of the heat treatment assembly (other end tube and adjoining central quartz tube). The other end tube is bolted or fastened by some quick sealing means to the quartz tube and a vacuum is produced on the interior of the chamber. Provision is made to feed the tube which is undergoing heat treatment through the quartz chamber into the other end tube. The primary coil of an induction generator is located surrounding the quartz tube, and this coil supplies energization to set up circulating currents in the tube undergoing heat treatment in the area of the quartz chamber. The circulating currents induced in the tube undergoing heat treatment cause it to heat in the area of the primary coil, and the heating operation is carried out for sufficient time to ensure that the annealing or other operation is complete. When the tube is passed completely through the quartz tube, the tube which has undergone heat treatment is then passed back into the opposite end portion, and the vacuum is broken, the first end tube is removed, and the operation has been completed.

BRIEF DESCRIPTION OF THE DRAWINGS

A further, more detailed explanation follows, which will make use of the accompanying drawings in which.

DESCRIPTION OF THE PREFERRED EMBODIMENT

Figure 1:
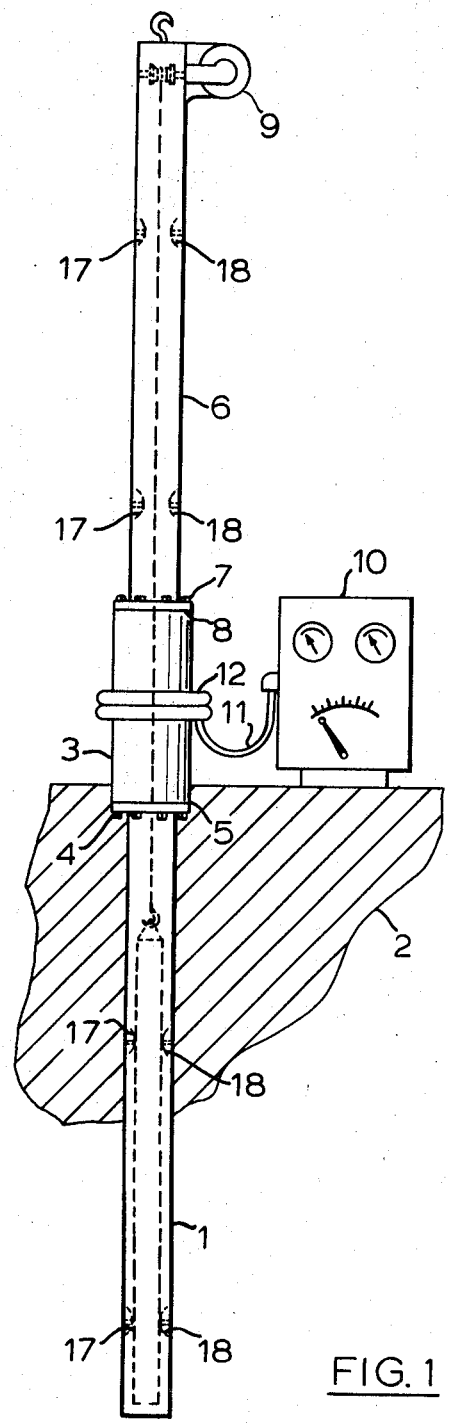
FIG. 1 illustrates the facility of this invention.
Figure 2:
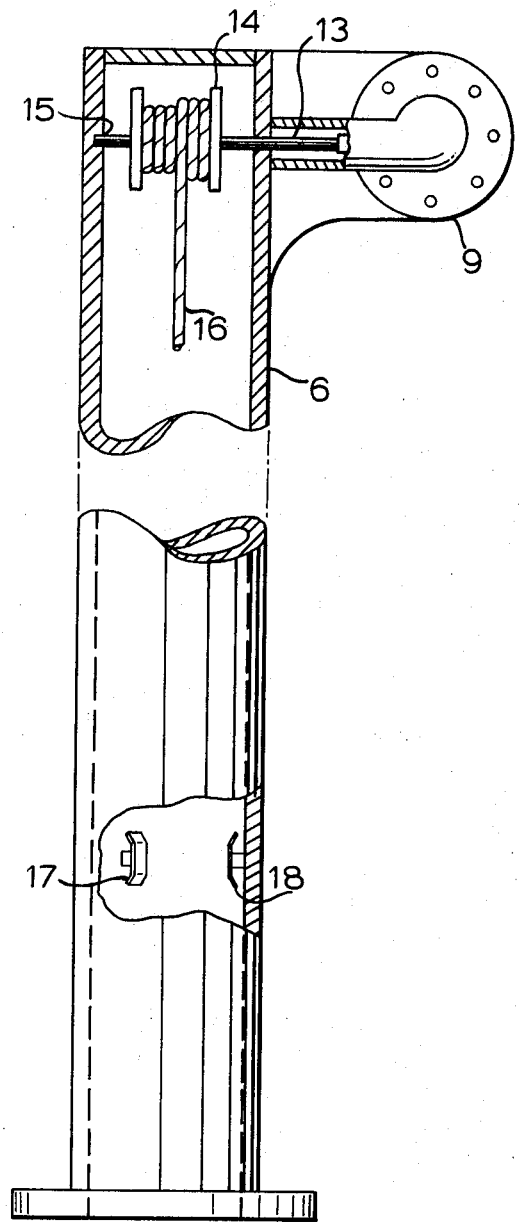
FIG. 2 illustrates a portion of the upper end tube in greater detail.

Referring now to the Figures, it will be seen that a capped end tube 1 is shown located in a vertical manner in some suitable restraining material 2. A quartz tube 3 is sealedly connected to end tube 1 at the end opposite the cap by means of bolts 4 and gasket 5. A second end tube 6 is sealedly connected to insulator tube 3 by means of bolts 7 and gasket 8. The materials composing the end portions are preferably of a metal which has been treated so that it will contain no occluded gases, and members 1 and 6 may be bolted, joined or suitable attached to the quartz member 3 by any suitable means. It will assist in working the invention if the junction of end member 6 and the quartz or pyrex tube 3 is a junction which may be joined or broken with relative swiftness and ease. Such junctions are quite common in the art, and will not be discussed.

It is also necessary that end member 6 contain a windlass or winch assembly 9 in order to provide a facility which can accurately pull the tube undergoing heat treatment through the central tube 3 of the facility. For this reason, a winch assembly 9 is housed within end portion 6. In order to supply the necessary energy for heat treatment operations, an induction generator 10 is located near the central insulator portion 3. Induction generator 10 is shown having leads 11 connected to primary coil 12 encircling the quartz or glass insulating tube 3.

Winch assembly 9 is shown having a motor driven shaft 13 with a drum 14 rigidly secured thereto, rotating in end bearing 15. A cable 16 is shown coiled on drum 14 and cable 16 is used to pull the workpiece through the insulator assembly at a constant speed.

Guides 17 and 18 are shown located in the two end tubes in order to maintain the workpiece in the center of the quartz or glass tube 3.

The operation of the invention is as follows.

When it is desired to heat treat a long tubular object, tube 6 is separated from tube 3 by a suitable uncoupling of the junction material or member. The workpiece to be heat treated is placed in the removed end tube 6. This is generally accomplished by fastening cable 16 to the workpiece and pulling the workpiece into the end tube 6. Tube 6 is swung back into place, and reconnected to tube 3 in a vacuum sealing fashion. A vacuum is drawn on the entire chamber. When sufficient vacuum has been drawn on the chamber, the workpiece to be treated is lowered into end tube 1, as illustrated in dotted lines in FIG. 1, below the primary coil 12 of the induction heater. The induction generator is energized and the hoist 9 is energized to initiate passage of the workpiece up through the working area of the induction coil 5. The rate at which the work will pass through the induction coil will depend on the treatment involved, and the length of the workpiece undergoing heat treatment. It will probably require in the order of 3 to 4 minutes for a workpiece in the order of 25 feet long to pass through the heat treatment area. The frequency of the induction coil will be determined for the heat treatment operation to be carried out on the workpiece. Generally a frequency in the order of 700 kilohertz to a magahertz is satisfactory. When the workpiece has been pulled completely through the induction coil or when the specific area which was to receive heat treatment has passed the work area, the coil 5 is deenergized, and the workpiece is pulled the rest of the way into tube 6. The junction of tube 6 and center tube 3 is again broken and the tube 6 is removed from the assembly and the workpiece is removed from tube 6.

It is seen that this apparatus involved relatively low capital cost, and that the zone which is undergoing heat treatment is of a restricted size, and the heat treatment can be closely controlled because the hot zone is amenable to precise measurement, and the control of the heat treatment operation is fairly straightforward. It also will be evident to those familiar with induction heating, that the heating of a small zone can be accomplished in a very short time. Also the cooling of the tube which was a very slow process in a vacuum furnace is now quite rapid because of the small amount of heat contained in the workpiece at the zone where heating is being applied. Because of the lack of masses involved, it also appears obvious that the restricted size and cleanliness of the containment vessel allows for a good vacuum and a protective atmosphere, so that the entire operation being carried out on the workpiece is taking place under ideal heat treatment conditions.

If it is desired to heat treat a number of tubes simultaneously in a facility of this nature, it is possible to use a susceptor with the induction heater in order to evenly distribute the heating energy of the primary coil of the induction heating apparatus among the tubes being heat treated at the same time.

The limit on the number of tubes being heat treated at one time would appear to be the limit in output power available from the induction generator.

The embodiments of the invention in which an exclusive property or privilege is claimed are defined as follows:

1. Apparatus for the induction heating of an elongated workpiece comprising a sealed elongated heat treatment chamber, composed of three tubular sections joined together in a sealing relationship, a central tubular section composed of relatively high dielectric constant material and being of substantially shorter length than said elongated workpiece, said central section being sealedly joined to a pair of tubular end sections, said end sections being enclosed at an end remote from the central section, said end sections being of a length substantially greater than the length of said central section, means for moving a workpiece through said chamber, and inductive heating means surrounding said central section.

2. Apparatus as claimed in claim 1 wherein said central section is quartz and the end sections are steel, said chamber being maintained so that the longitudinal axis is in a vertical direction.

3. Apparatus as claimed in claim 2 wherein said means for moving a workpiece through said chamber comprises a winch mounted in the topmost end section.

* * * * *